UNITED STATES PATENT OFFICE.

JULIUS BAUR, OF BROOKLYN, NEW YORK.

IMPROVEMENT IN THE MANUFACTURE OF CHROME-STEEL.

Specification forming part of Letters Patent No. 170,507, dated November 30, 1875; application filed May 19, 1875.

*To all whom it may concern:*

Be it known that I, JULIUS BAUR, of the city of Brooklyn, in the county of Kings and State of New York, have invented a new and useful Improvement in the Manufacture of Steel, which improvement is fully set forth in the following specification:

This invention relates to certain improvements in the manufacture of steel which I term "Chrome-Steel," and which I have described in Letters Patent No. 49,495, dated August 22, 1865, and also in Letters Patent No. 99,624, dated February 9, 1870.

The manufacture of chrome-steel, as described in the above-named Letters Patent, can be effected either by the direct employment of chrome-ore with the iron to be converted into steel, or by the employment of an alloy of chrome with iron and carbon, which is first prepared, and afterward melted together with the iron to be converted into steel.

My present improvement consists, first, in combining, with the chrome-ore and with the iron to be converted into steel, a quantity of graphite and borax, whereby the reduction of the chrome-ore, and of the protoxide of iron contained in said chrome-ore, is materially facilitated; the carbon, being used in the form of graphite, is not too easily decomposed; and the metallic chrome resulting from this reduction is caused to unite readily and uniformly with the iron to be converted into steel. My improvement consists, further, in producing chrome-steel by first melting together a quantity of chrome-ore, borax, and graphite with a quantity of metallic iron, and then uniting the iron to be converted into steel with a suitable quantity of the above compound, and with a suitable quantity of carbon.

In carrying out the first part of my present improvement I first test the chrome-ore which I have to use, and, according to the impurities contained in or mixed with said chrome-ore, I change the proportion of the remaining ingredients. If the chrome-ore, for instance, is found to contain forty-five per cent. of protoxide of iron, forty per cent. of oxide of chrome, and fifteen per cent. of gangue, I mix with one hundred pounds of wrought-iron, free from sulphur and phosphorus, sixteen ounces of chrome-ore, and twelve ounces of graphite, and one and one-half ounce of borax, assuming that the quantity of carbon combined with the wrought-iron be 0.20 or 0.23 per cent. The chrome-ore, the graphite, and the borax are pulverized, and the wrought-iron is cut up in small pieces. The chrome-ore, the graphite, and the borax are placed on the bottom of the crucible, and then the iron is packed in.

For the purpose of preparing steel of increased hardness, I use for one hundred pounds of wrought-iron thirty-two ounces of chrome-ore, eighteen ounces of graphite, and three ounces of borax. By the action of the borax the reduction of chrome-ore is greatly facilitated, and the metallic chrome resulting from this reduction unites readily with the wrought-iron to be converted into steel; and by using graphite I avoid all danger of having the carbon destroyed by the excessive heat before the same has time to produce the requisite reaction.

In carrying out the second part of my present improvement, I take fifteen pounds of pulverized chrome-ore, mix it with one and one-half pounds of borax, and three pounds of graphite, and add thereto fifteen pounds of metallic iron; then I expose the whole to a high temperature. By the action of the iron the reduction of the chrome-ore is materially facilitated, and from the above mixture I obtain twenty-four pounds of an alloy containing chiefly metallic chrome, metallic iron, and carbon. In this operation I use graphite, because, in the high heat required for the reduction of a large mass of chrome-ore, ordinary charcoal will not be sufficiently refractory to produce the required effect.

The mixture of chrome-ore, borax, and graphite I place in the lower part of the crucible, and in the upper part thereof the iron and charcoal are packed, and by heating the mass to a high temperature the desired alloy of metallic chrome, metallic iron, and a small percentage of carbon is produced.

The proportion in which I smelt the various ingredients together depends upon the degree of steel to be produced.

For steel of ordinary hardness the proportion is about as follows: Wrought-iron, one hundred pounds; alloy of chrome and iron, twenty-six ounces; charcoal, four and one-half ounces.

For steel of superior hardness the proportion is as follows: Wrought-iron, one hundred pounds; alloy of chrome and iron, forty ounces; charcoal, twelve ounces.

For gun metal I use from twenty to forty ounces of my alloy to one hundred pounds of wrought-iron without any charcoal.

My alloy is applicable not only in preparing steel in crucibles, as above described, but it can be employed in every process of manufacturing steel, such as the Bessemer process, the Siemens-Martin process, and the ordinary puddling process. In the Bessemer and Siemens-Martin processes from one to two per cent. of my alloy are added to the spiegeleisen with which the decarbonized Bessemer metal is to be recarbonized. In the puddling process the alloy is melted together with the iron, and the operation is conducted in the ordinary manner of puddling; but the percentage of my alloy must be increased, since during the operation a portion of the chrome is oxidized.

I disclaim in this application for patent everything shown and described in my patents No. 49,495 and No. 99,624.

What I claim as new, and desire to secure by Letters Patent, is—

1. The process herein described of manufacturing chrome-steel, the same consisting in mixing a quantity of graphite and borax with the chrome-ore and the iron to be converted into steel, substantially in the manner and for the purpose specified.

2. A compound from which to manufacture chrome-steel, consisting of an alloy produced from chrome-ore, borax, graphite, and metallic iron, substantially as and for the purpose described.

In testimony that I claim the foregoing I have hereunto set my hand and seal this 13th day of May, 1875.

JULIUS BAUR. [L. S.]

Witnesses:
W. HAUFF,
E. F. KASTENHUBER.